United States Patent
Haselden et al.

(10) Patent No.: US 8,443,351 B2
(45) Date of Patent: May 14, 2013

(54) PARALLEL LOOPS IN A WORKFLOW

(75) Inventors: J. Kirk Haselden, Sammamish, WA (US); Sergei Ivanov, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 2002 days.

(21) Appl. No.: 11/360,117

(22) Filed: Feb. 23, 2006

(65) Prior Publication Data

US 2007/0240112 A1    Oct. 11, 2007

(51) Int. Cl.
 *G06F 9/45* (2006.01)
(52) U.S. Cl.
 USPC ............ 717/150; 717/149; 717/159; 717/160
(58) Field of Classification Search .......... 717/141–161, 717/140
 See application file for complete search history.

(56) References Cited

U.S. PATENT DOCUMENTS

| | | | |
|---|---|---|---|
| 3,322,027 A * | 5/1967 | Forbes et al. ................... 353/25 |
| 5,230,053 A * | 7/1993 | Zaiki .............................. 717/150 |
| 5,317,743 A | 5/1994 | Imai et al. |
| 5,437,034 A * | 7/1995 | Tanaka et al. ................. 717/160 |
| 5,481,723 A | 1/1996 | Harris et al. |
| 5,491,823 A * | 2/1996 | Ruttenberg ................... 717/161 |
| 5,852,734 A | 12/1998 | Komatsu et al. |
| 5,872,989 A | 2/1999 | Tsushima et al. |
| 5,898,866 A | 4/1999 | Atkins et al. |
| 6,078,982 A | 6/2000 | Du et al. |
| 6,397,192 B1 * | 5/2002 | Notani et al. ...................... 705/9 |
| 6,415,297 B1 * | 7/2002 | Leymann et al. ............. 707/201 |
| 6,438,747 B1 * | 8/2002 | Schreiber et al. ............. 717/160 |
| 6,539,541 B1 * | 3/2003 | Geva .............................. 717/150 |
| 6,678,882 B1 * | 1/2004 | Hurley et al. ................. 717/121 |
| 6,757,689 B2 * | 6/2004 | Battas et al. ................... 707/101 |
| 6,772,415 B1 * | 8/2004 | Danckaert et al. ............ 717/161 |
| 6,986,131 B2 * | 1/2006 | Thompson et al. ........... 717/160 |
| 6,993,756 B2 * | 1/2006 | Ogawa et al. ................. 717/159 |
| 7,058,561 B1 * | 6/2006 | Kumar ............................ 703/22 |
| 7,086,038 B2 * | 8/2006 | Cronquist et al. ............ 717/136 |
| 7,131,119 B2 * | 10/2006 | Kumar ........................... 717/160 |
| 7,140,009 B2 * | 11/2006 | Tal et al. ........................ 717/160 |
| 7,222,337 B2 * | 5/2007 | Click et al. .................... 717/160 |
| 7,248,265 B2 * | 7/2007 | Zimmer ........................ 345/530 |
| 7,257,780 B2 * | 8/2007 | Metzgen ........................... 716/2 |
| 7,272,820 B2 * | 9/2007 | Klianev ......................... 717/109 |
| 7,555,745 B2 * | 6/2009 | Iwashita ........................ 717/137 |
| 2001/0044738 A1 | 11/2001 | Elkin et al. |
| 2002/0078333 A1 | 6/2002 | Inoue et al. |

(Continued)

OTHER PUBLICATIONS

Hybinette, M., et al.; "Cloning Parallel Simulations," ACM Transactions on Modeling and Computer Simulation, vol. 11, No. 4, Oct. 2001, pp. 378-407.

(Continued)

*Primary Examiner* — Wei Zhen
*Assistant Examiner* — Qing Chen
(74) *Attorney, Agent, or Firm* — Workman Nydegger

(57) ABSTRACT

The subject disclosure pertains broadly to parallelization of workflow loops. More specifically, loop containers and related elements are cloned several times to match a desired number of parallel iterations or threads. The cloned containers are communicatively coupled or connected to a single enumerator component and can interact therewith to facilitate acquisition of collection elements. This arrangement, among other things, ensures that the correct number of iterations are executed as if the loop was processed sequentially.

16 Claims, 12 Drawing Sheets

U.S. PATENT DOCUMENTS

| | | |
|---|---|---|
| 2002/0147515 A1 | 10/2002 | Fava et al. |
| 2003/0018508 A1* | 1/2003 | Schwanke .......................... 705/9 |
| 2003/0050797 A1* | 3/2003 | Brandt et al. ...................... 705/2 |
| 2003/0182355 A1* | 9/2003 | Edahiro et al. ................. 709/106 |
| 2003/0217053 A1 | 11/2003 | Bachman et al. |
| 2004/0003386 A1* | 1/2004 | Tal et al. ........................ 717/160 |
| 2004/0015916 A1* | 1/2004 | Click et al. ..................... 717/150 |
| 2004/0187089 A1* | 9/2004 | Schulz ........................... 717/101 |
| 2005/0022164 A1* | 1/2005 | Takacsi-Nagy ................ 717/117 |
| 2005/0027585 A1 | 2/2005 | Wodtke et al. |
| 2005/0149908 A1* | 7/2005 | Klianev ......................... 717/109 |
| 2006/0070025 A1* | 3/2006 | Mauceri et al. ................. 717/106 |
| 2006/0248520 A1* | 11/2006 | Kawabata et al. ............. 717/160 |
| 2007/0094652 A1* | 4/2007 | Chia et al. ...................... 717/151 |
| 2007/0174810 A1* | 7/2007 | Hockenberry et al. ........ 717/101 |
| 2007/0174822 A1* | 7/2007 | Moser et al. .................. 717/136 |
| 2008/0028323 A1* | 1/2008 | Rosen et al. ................... 715/752 |

OTHER PUBLICATIONS

Fahringer, et al.; "A-GWL: Abstract Grid Workflow Language," (2 pages).

Jugravu, et al.; "Scheduling Workflow Distributed Applications in JavaSymphony" (2 pages).

\* cited by examiner

PARALLEL LOOPS IN A WORKFLOW

BACKGROUND

Workflow systems represent the application of technology to process management. A workflow is an organized set of interrelated tasks that define the operational aspect of a process or procedure. In particular, a workflow defines how tasks are structured, which entities are responsible and relative ordering of tasks, among other things. A workflow facilitates automated design, control and monitoring of processes.

One widely known workflow is the enterprise workflow. A workflow in this domain automates business processes such that documents, information or tasks are passed to individuals for action in accordance with procedural rules. For instance, a worker performs some designated work in a sequence. Subsequently, work by others can be initiated after the worker completes their task. In effect, delivery of work is automated and controlled based on completion of precedent tasks. By way of example, a loan evaluation or approval process could be represented as a workflow.

Workflow can also be associated with computer systems and functionality associate therewith, rather than solely human tasks. For example, workflows can be defined to facilitate data transformation services including processing, cleansing and storing data in a data warehouse, amongst other things.

workflow management system facilitates creation or a workflow and management of workflow execution. First, a workflow or workflow diagram is created from an object model utilizing a process modeling notation or language. Such a notation is a conventionally a graphical representation of objects such as data flow, control and connection objects and relationships amongst objects. Through this language or notation, processes can be developed utilizing what is sometimes referred to as a workflow modeling component, build time system or design system.

In one conventional implementation, packages represent a unit of work that can be independently retrieved, executed and/or saved. Furthermore, the package serves as a container for all other elements broadly characterized as control flow or data flow.

Control flow elements dictate processing sequence in a package and can include one or more containers to define package structure, tasks that define package functionality or work and precedent constraints that link executables, containers and tasks and specify the order of execution of the linked objects. Control flow elements prepare or copy data, interact with other processes or implement repeating workflow.

Data flow elements including source adapters, transformations and destination adapters, as the name suggests, define the flow of data in a package that extracts, transforms and loads data. Source adapters make data available to a data flow. Transformations perform modifications to data such as aggregation (average, sum), merging (of multiple input data sets), distribution (to different outputs) and data type conversion. Destination adapters load output of the data flow into target repositories such as flat files, databases or memory.

In addition to a design or build-time component, a workflow management system also includes an execution management component or run-time system. Such a system can include a workflow engine that coordinates performance of process or task steps defined by a workflow. In other words, the workflow engine enforces specified control flow and precedent constraints or manages execution of a workflow object model.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject innovation pertains to parallelizing processing of workflow loop objects or containers. More specifically, a loop comprising a workflow diagram can be executed such that iterations of the loop workflow can execute concurrently with one another, for instance on different processing units. The innovation can thus dramatically improve throughput and reduce processing time by taking advantage of parallelism with respect to workflow object-model execution.

One way to implement a loop is to represent the body of a loop as a workflow container while associating the looping portion with an enumerator that supplies items over which the workflow loop iterates. The iteration can comprise obtaining the next item of a collection from the enumerator and executing the workflow if an item is successfully acquired, otherwise terminating.

In accordance with an aspect of the subject innovation, loop workflow as well as the environment associated with the workflow can be cloned. In essence, the workflow can be configured once and replicated to produce multiple instances of the workflow. Furthermore, the environment including variables can be replicated to produce truly independent logical threads.

According to another aspect of the innovation, the clones or multiple instances of loop workflow can be communicatively coupled to a single enumerator and scheduled to execute simultaneously. The enumerator can thereby ensure that the number of iterations that will execute will be equivalent to a sequential case.

In accordance with still another aspect of the innovation, the number of loop workflow instances or clones generated depends on automatic detection of available resources. A component can analyze the resources and configurations thereof and recommend the number of instances that should be generated and ultimately connected to a single enumerator component.

According to yet another aspect of the innovation, loops can be automatically designated for parallel execution. For instance, a system analysis component can analyze an executing system to determine if and the extent to which parallel execution is supported. This information can be provided to a workflow analysis component that scrutinizes a workflow to identify loops to be designated for concurrent processing by another component.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Figure 1:
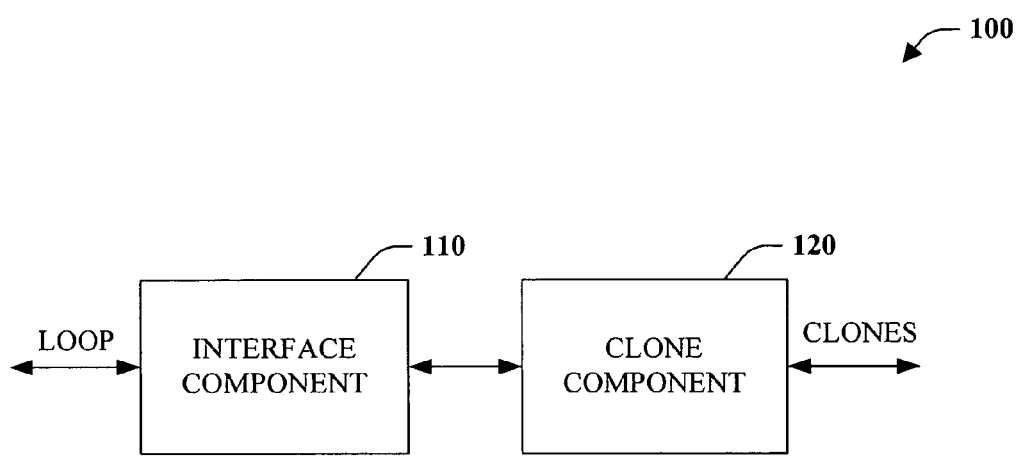
FIG. 1 is a block diagram of a workflow execution system that clones workflows.

The various aspects of the subject innovation are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

As used in this application, the terms "component," "system" "object" and the like are intended to refer to a computer-related entity, either hardware, a combination of hardware and software, software, or software in execution. For example, a component may be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs. Similarly, examples are provided herein solely for purposes of clarity and understanding and are not meant to limit the subject innovation or portion thereof in any manner. It is to be appreciated that a myriad of additional or alternate examples could have been presented, but have been omitted for purposes of brevity.

Artificial intelligence based systems (e.g., explicitly and/or implicitly trained classifiers) can be employed in connection with performing inference and/or probabilistic determinations and/or statistical-based determinations as in accordance with one or more aspects of the subject innovation as described hereinafter. As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus, or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring initially to FIG. 1, a workflow execution system 100 is illustrated in accordance with an aspect of the subject innovation. The system 100 includes an interface component 110 and a clone component 120 communicatively coupled together. The interface component 110 receives, retrieves or otherwise obtains or acquires a loop object or container. A loop container defines an execution sequence for a workflow or set of tasks associated with the container. The loop container can include, amongst other things, a property or attribute to indicate whether the loop is to be parallelized or sequentially executed. The clone component 120 can retrieve or receive a loop designated for parallel execution from the interface component 110. Upon acquisition of such a loop, the clone component 120 can clone or replicate the workflow and associated elements a number of times. By way of example and not limitation, the workflow may be persisted and subsequently un-persisted a number of times to produce a particular number of workflow instances or clones. The number of clones produced corresponds to the number of desired parallel iterations or threads, which can be specified for instance via an attribute either manually or automatically.

Figure 2:
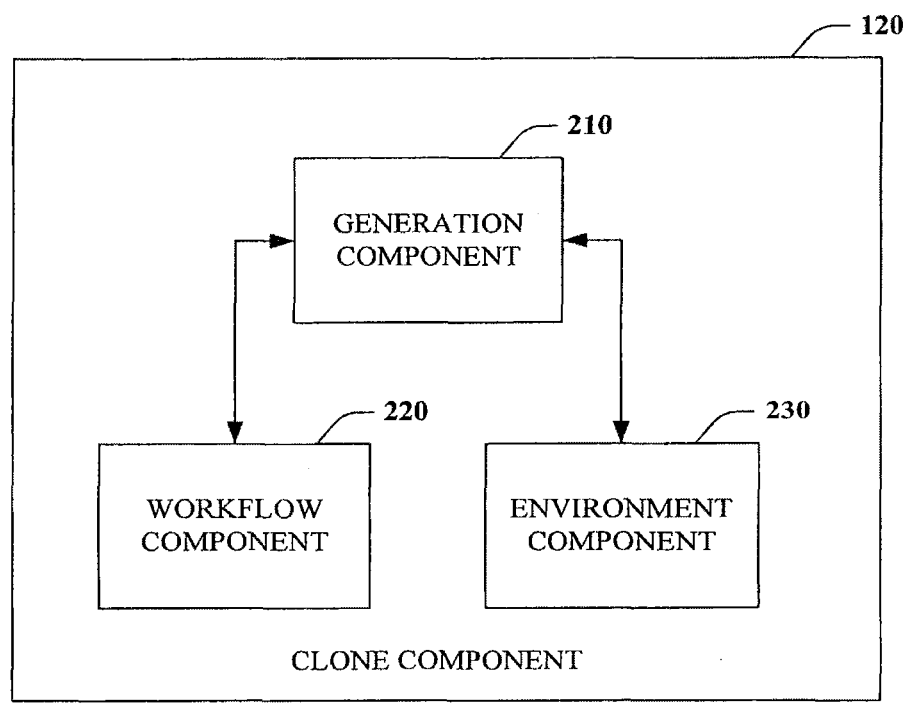
FIG. 2 is a block diagram of a clone component.

FIG. 2 depicts a clone component 120 in accordance with an aspect of the subject innovation. The clone component 120 includes a generation component 210 that facilitates production of clones or replicas by coordinating actions performed by workflow component 220 and environment component 230. Upon obtaining a loop container, the generation component 210 may call or initiate action by workflow component 220 followed by environment component 230 or vice versa. The workflow component 220 replicates a loop workflow or body of the loop. For example, if the workflow comprises tasks 1, 2, and 3 then the replica will have tasks 1, 2, and 3. The environment component 230 replicates the environment surrounding the workflow or workflow dependent objects. For example, environment component 230 can clone workflow variables and/or mechanisms that facilitate interaction with components outside the loop container including but not limited to connection managers.

Cloning is an efficient mechanism for generating a plurality of logical threads. Only a single loop container needs to be configured during design time. Subsequently, the loop container and dependent objects can be replicated a number of times to facilitate current processing. Alternatively, a number of threads can be generated manually at design time however this requires configuration and maintenance of multiple threads rather than just one. This could become quite onerous where changes are made to the loop container or workflow contained therein.

Figure 3:
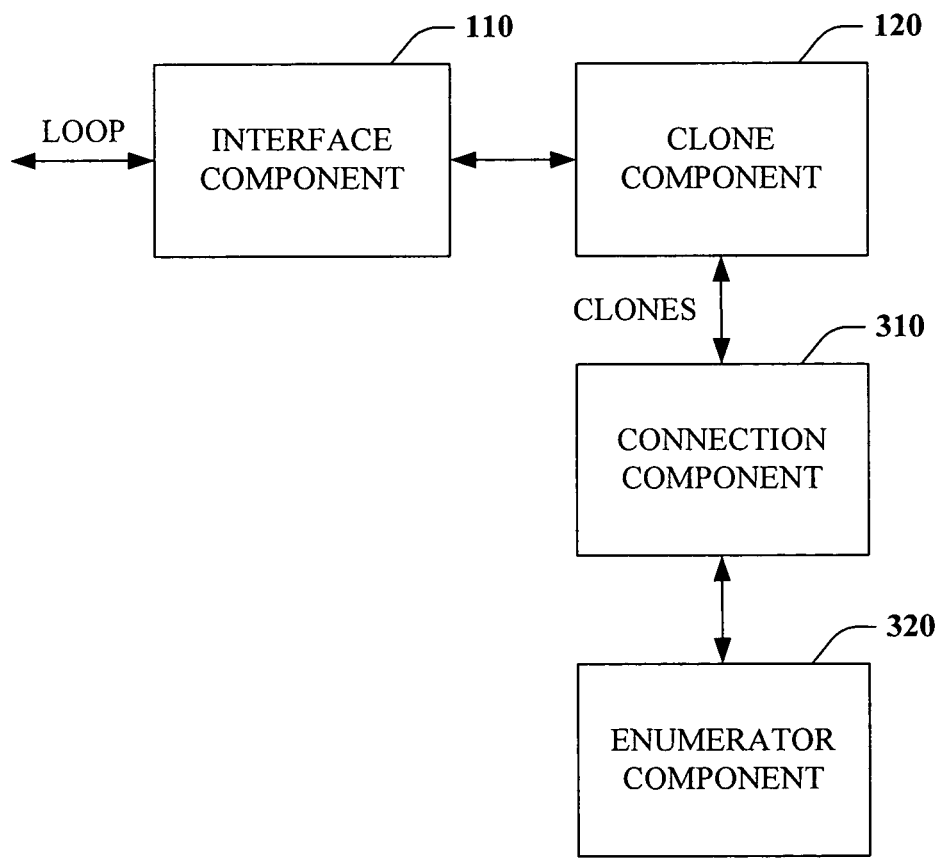
FIG. 3 is a block diagram of a workflow execution system that couples a plurality of workflow instances to an enumerator.

Turning attention to FIG. 3, a workflow execution system 300 is illustrated in accordance with an aspect of the subject innovation. The workflow execution system 300 includes interface component 110 and clone component 120 as previously described. In brief, the interface component 110 is operable to receive, retrieve or otherwise acquire the loop container from a workflow. The loop container can then be transferred to or otherwise acquired by the clone component 120. The clone component 120 clones or replicates the workflow included within the loop component as well as the environment surrounding the workflow. The cloned workflow and dependent objects (or simply the cloned workflow) can be received, retrieved or otherwise obtained by connection component 310. The connection component 310 connects or communicatively couples the cloned workflow to a single enumerator component 320. An enumerator component 320 iterates over a collection of items or elements. The enumerator component 320 can be configured to be specific to a particular type such as a file or the like. The connection component 310 connects the clones to a single enumerator configured for a particular type and associated with a collection of interest.

Figure 4:
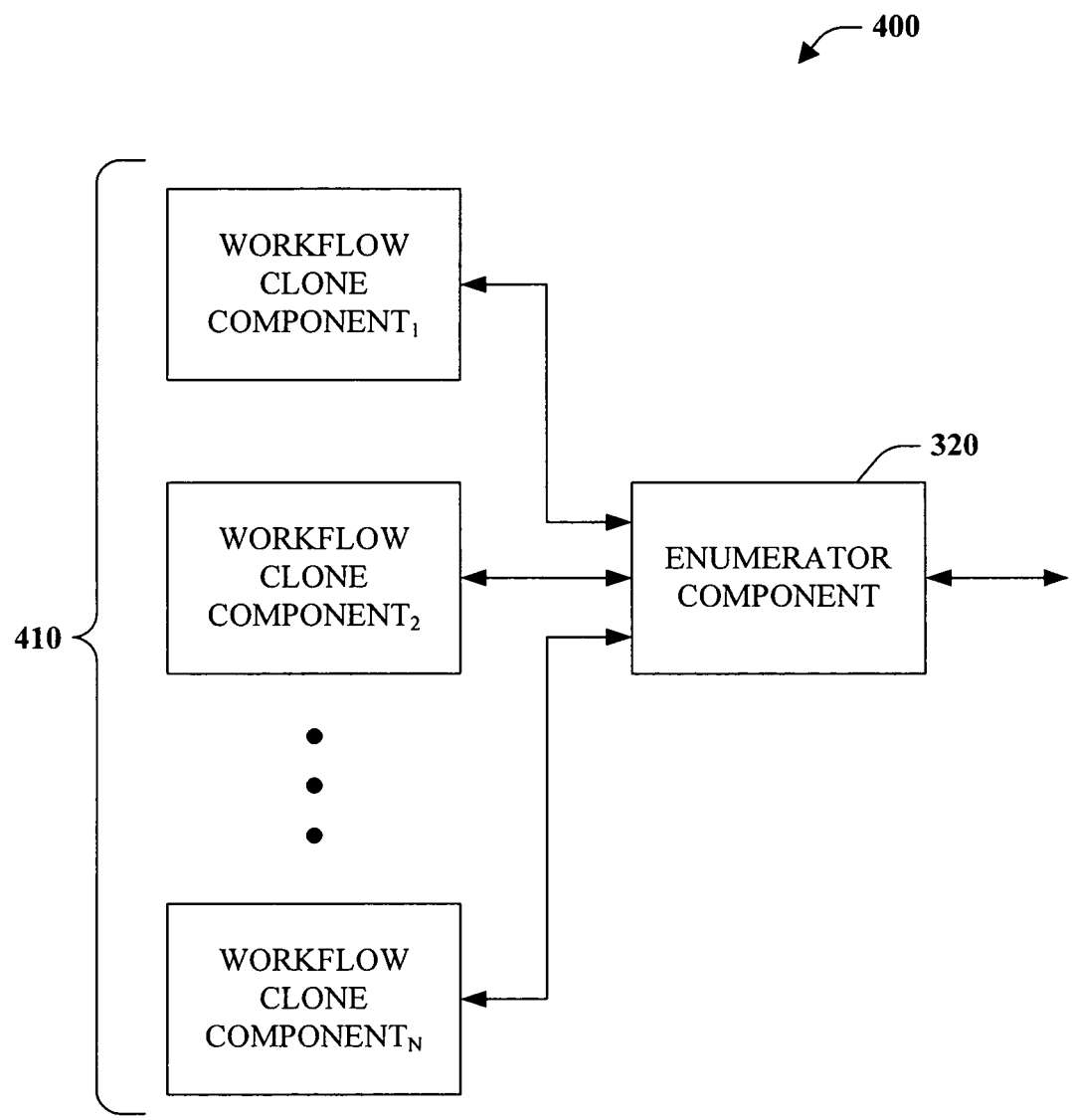
FIG. 4 is a diagrammatic illustration of the relationship between clones and an associated enumerator.

FIG. 4 provides a graphical illustration 400 of the relationship between a plurality clones and an enumerator. As shown, workflow clones $410_{1-N}$ (where N is an integer greater than one) are communicatively coupled to the single enumerator component 320. All workflow clones 410 can be scheduled to execute simultaneously. Accordingly, rather than the enumerator component 320 feeding a single workflow 410, a plurality of clones can be supplied with data to processes concurrently, thereby dramatically improving throughput.

For purposes of clarity and not limitation, consider the following example. Suppose a system needs to process one hundred flat files during a processing window and there is a loop that states for each file perform a series of one or more transformations—a for-each loop container. If this process were to be serialized by employment of a single workflow clone 410 and a single enumerator 320, each file would have to wait for the previous file to finish execution before another file can begin. For small processing windows such as between midnight and 5 a.m., one can appreciate that the processing window may be longer than the system availability. However, where there is a plurality of clones of the workflow 410 fed by the same enumerator 320, multiple files can be processed simultaneously thereby shortening the processing window.

More specifically, a workflow clone can request a value from the file enumerator 320. The enumerator 320 can then identify a file name and store that name in the cloned variable associated with particular clone instance. The clone can subsequently reference the variable and process the file named or referenced therein. Each of the flat files is referenced by the enumerator once. When a subsequent logical thread or clone asks for the name of the next file to process, the enumerator provides the name of the next file that has yet to be requested for processing.

Cloning is important with respect to this process for several reasons. First, cloning of a workflow is important to facilitate parallel processing. Second, only one workflow has to be specified and then that workflow can simply be replicated. Furthermore, cloning of the variable and other dependent objects is significant because if a single variable were utilized, it would be possible for two different workflows to process the same file. For instance, if workflow clone component$_1$ requests a file to process and then workflow clone component$_2$ requests a file, if the workflow clone component$_1$ does not read the file name from the variable prior to it being changed by the request from workflow clone component$_2$, then both workflow clones will process the same file.

Figure 5:
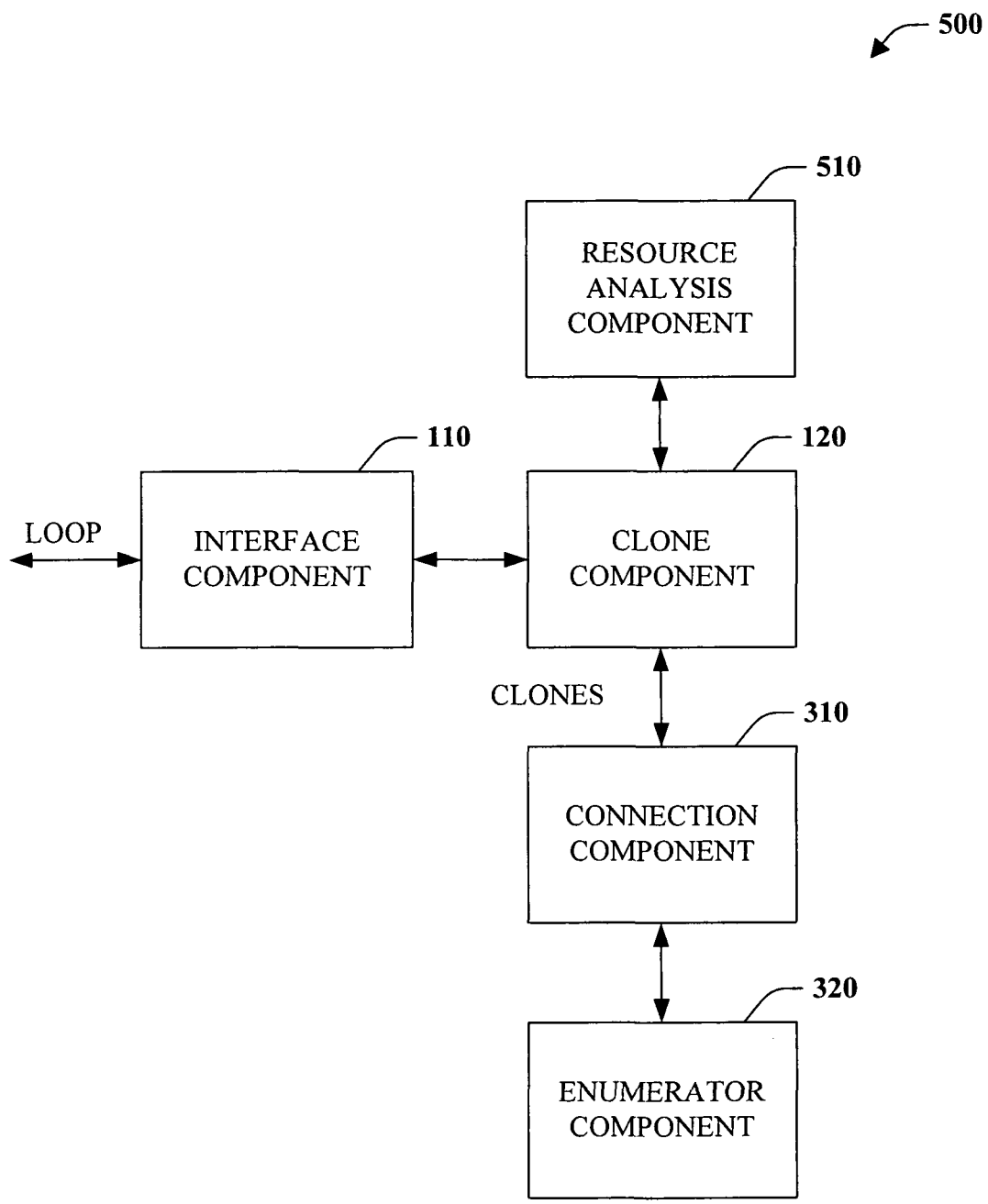
FIG. 5 is a block diagram of a workflow execution system including a resource analysis component.

FIG. 5 depicts a workflow execution system 500 in accordance with an aspect of the subject innovation. The system 500 includes previously described components including the interface component 110, clone component 120, connection component 310 and enumerator component 320. In short, the interface component 110 acquires a loop container such as a for-each loop container. The clone component 120 obtains and replicates loop workflow and environment where parallel execution is indicted or determined advantageous. Generated clones are then coupled via connection component 310 to enumerator component 320 to facilitate simultaneous execution. While the number of clones generated by the clone component 120 can be specified by a user or otherwise hard code, this is not strictly necessary.

System 500 includes a resource analysis component 510 communicatively coupled to the clone component 120. The resource analysis component 510 determines an appropriate number of clones to be generated and provides or otherwise supplies that number to clone component 120. Clone component 120 can receive or retrieve the value generated by component 510 and produce the specified number of clones. The resource analysis component 510 can generate this number by analyzing system resources and/or configurations, among other ways. By way of example and not limitation, the analysis component 510 can identify two processors or a single dual core processor associated with the system executing a workflow. In this instance, the resource analysis component can recommend two clones be generated. This is, of course, a simplistic example. It is to be appreciated that the resource analysis component 510 can additionally or alternatively perform more complex analysis pertaining to available resources, configuration, and inferred or predicted processor load, among other things. The resource analysis component 510 can also receive or retrieve feedback information to facilitate improving future recommendations, for example based on one or more machine learning technologies.

Figure 6:
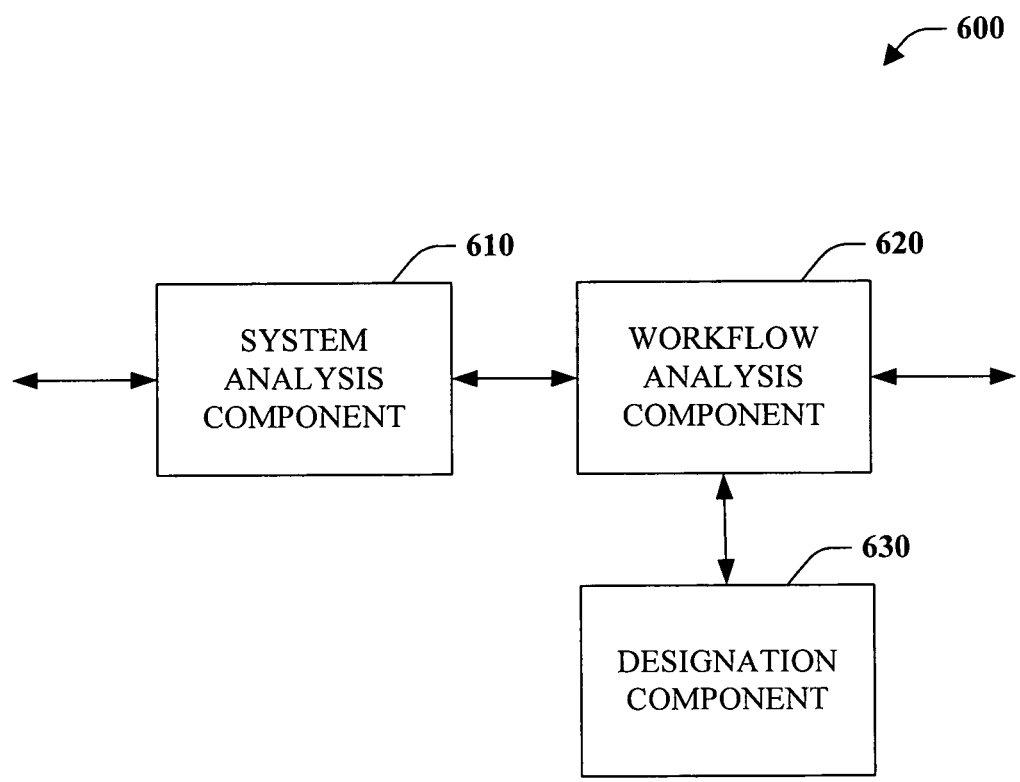
FIG. 6 is a block diagram of a workflow optimization system.

Referring to FIG. 6, a workflow optimization system 600 is illustrated in accordance with an aspect of the subject innovation. The system 600 can facilitate automatic parallelization of workflow loops where such action will optimize or otherwise improve execution performance. The system 600 includes system analysis component 610, workflow analysis component 620 and designation component 630. The system analysis component 610 analyzes an execution system and/or configuration thereof to determine if and to what extent parallelization is supported. For instance, a single processor system would likely not support concurrent or parallel processing whereas a multiprocessor system would support this type of execution. Workflow analysis component 620 receives or retrieves information from the system analysis component 610 regarding the extent of support for parallel processing, if at all. Based at least in part on this information, the workflow analysis component can analyze or scrutinize the workflow to determine if there are any loops that would be able to be executed in parallel to improve process efficiency and/or throughput. For example, a for-each loop might be identified. The identity of loops that should be parallelized is provided to or made available for retrieval by designation component 630. The designation component 630 can then mark the identified items for parallel execution, for example by setting an attribute or flag denoting this fact. Accordingly, upon processing, the workflow execution can be improved or optimized without or with limited user intervention.

The aforementioned systems have been described with respect to interaction between several components. It should be appreciated that such systems and components can include those components or sub-components specified therein, some of the specified components or sub-components and/or additional components. For example, a workflow system can include the interface component 110, clone component, 120, connection component 310 and resource analysis component 510 or various combinations of one or more of those components. Sub-components could also be implemented as components communicatively coupled to other components rather than included within parent components. Further yet, one or more components and/or sub-components may be combined into a single component providing aggregate functionality. The components may also interact with one or more other components not specifically described herein for the sake of brevity, but known by those of skill in the art.

Furthermore, as will be appreciated, various portions of the disclosed systems and methods may include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, the resource analysis component 510 and the system analysis component 610 can infer or predict support or the degree of parallelism provided by a machine based on previous interactions with the same or like machines under similar conditions.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Figure 7:
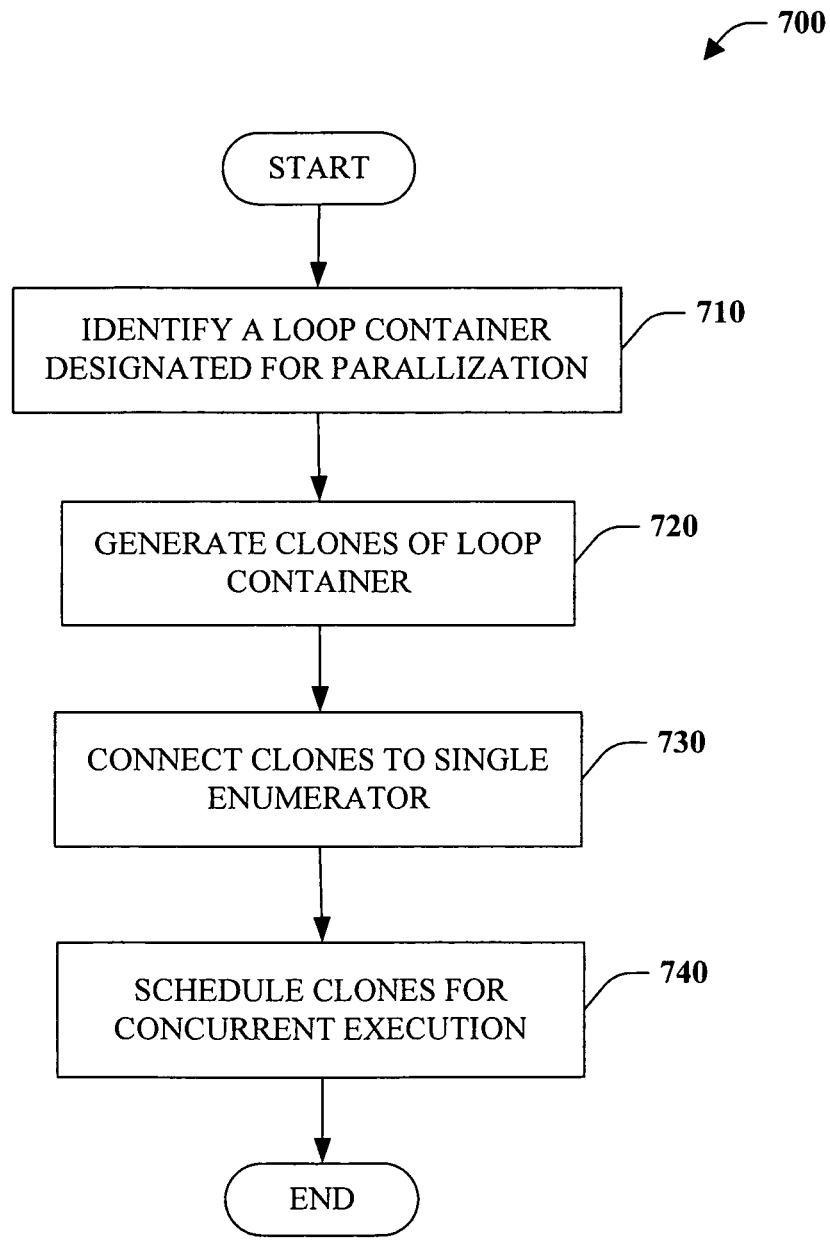
FIG. 7 is a flow chart diagram of a method of parallelizing workflow loop objects.

Turning to FIG. 7, a method 700 of parallelizing a workflow is depicted according to an aspect of the subject innovation. At reference numeral 710, a loop container is identified that is designated for parallelization. For example, the loop container can include a Boolean property or attribute to indicate whether the loop is to be executed sequentially or concurrently. Such a loop could be set manually or automatically as part of an optimization procedure, amongst other ways.

At numeral 720, clones or replicas of a loop container workflow and associated environment are generated. A loop container could correspond in one exemplary scenario to a for-each loop specifying that for each particular element a workflow or set of one or more tasks can be performed with respect to that item. For example, for each flat file in a collection of files, an extract, transform, and load (ETL) process can be performed to facilitate data warehouse population. The actual number of replicas can be dependent on the execution machine or configuration thereof as determined manually or automatically. Accordingly, a plurality of independent workflows or logical threads are generated even though only a single workflow was provided at design time.

The clones or logical threads are communicatively coupled to a single enumerator component at reference numeral 730. The enumerator drives the looping portion of the loop container. In the for-each loop example above, the enumerator will provide a unique file to each requesting thread until all the files in the collection have been processed.

At reference numeral 740, the independent clones or threads are scheduled for parallel or concurrent execution. In a sequential execution, a single enumerator would be connected to a single workflow. Once the first iteration of the workflow loop is completed, a request would be made for another element or here a file from the collection. With multiple workflows coupled to the same enumerator, multiple elements can be processed simultaneously. All things equal, process time can be reduced by a multiple of the number of concurrently executing threads.

Figure 8:
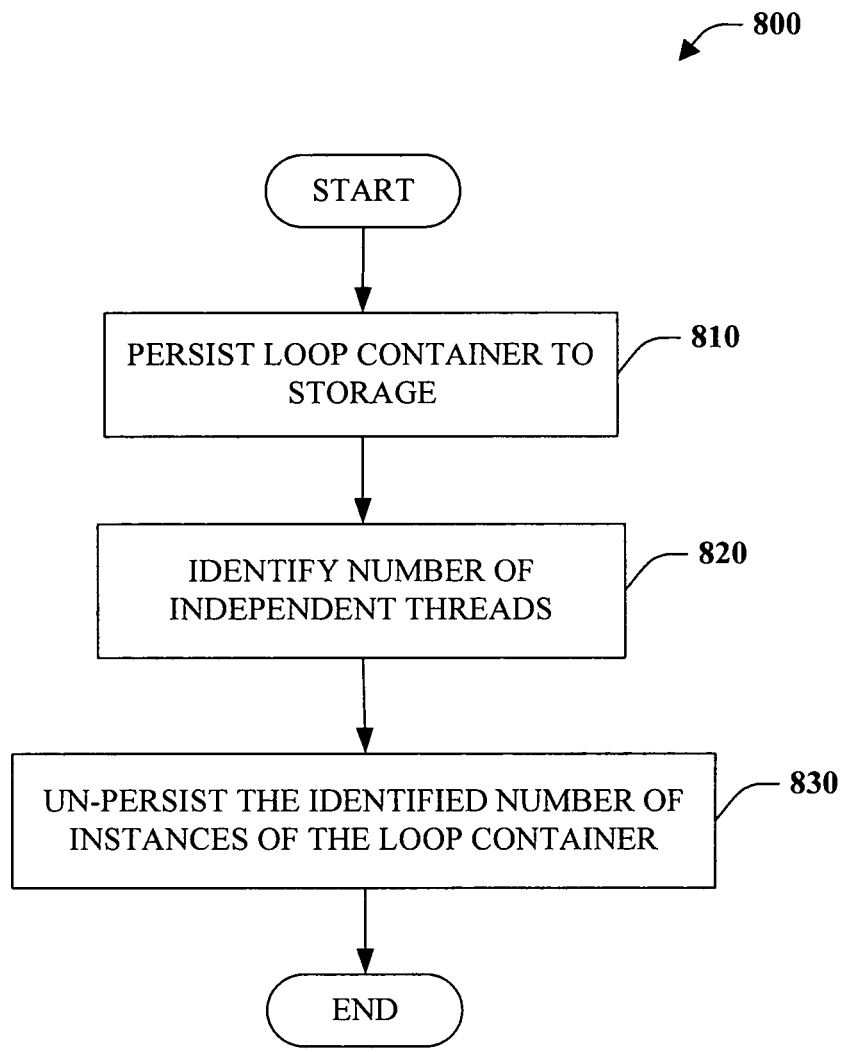
FIG. 8 is a flow chart diagram of an exemplary cloning methodology.

FIG. 8 illustrates an exemplary cloning methodology 800 in accordance with an aspect of the subject innovation. At reference numeral 810, a workflow loop container an associated environment is persisted to storage. At 820, the number of desired threads or clones is identified. This number can be dependent upon system resources and configuration thereof. At reference numeral 830, the identified number of the loop containers are un-persisted or instantiated from the persisted version. It should be appreciated that a loop container environment can also be clone together with the loop workflow and or separate utilizing the same method. Cloning is advantageous because it becomes possible to configure the workflow once and execute a plurality of logical threads. Alternatively, each logical thread would need to be configured independently such that each of the threads is saturated or receives enough collection elements to keep it busy. Furthermore, each of these threads would need to be maintained in light of changes.

Figure 9:
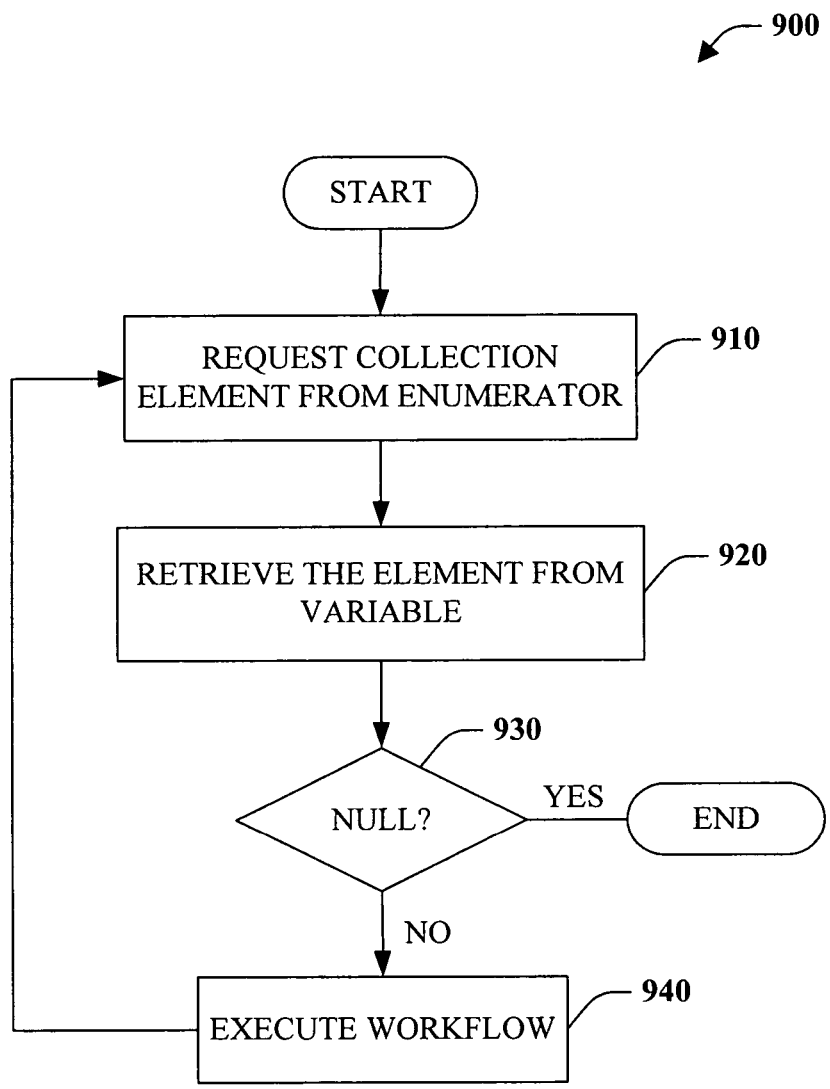
FIG. 9 is a flow chart diagram of a method of thread execution.

FIG. 9 is a flow chart diagram of a method 900 of thread execution in accordance with an aspect of the subject innovation. Here, the thread corresponds to a workflow associated with a loop. The method 900 illustrates the interaction between one or more independent threads and an associated enumerator. At reference numeral 910, request is made for a collection element for processing from an associated enumerator. At numeral 920, a value is retrieve or read from a thread variable. The value is then checked to determine if it is null at 930. If no, the method proceeds to numeral 940 where the thread workflow is executed. Subsequently, the method proceeds to reference numeral 910 where another element is requested for processing. However, if at 930 the value is null, then the method simply terminates. The null value thus acts as an indicator that there are no more elements to process. The method 900 can be performed simultaneously by multiple threads to affect parallel or concurrent processing.

Figure 10:
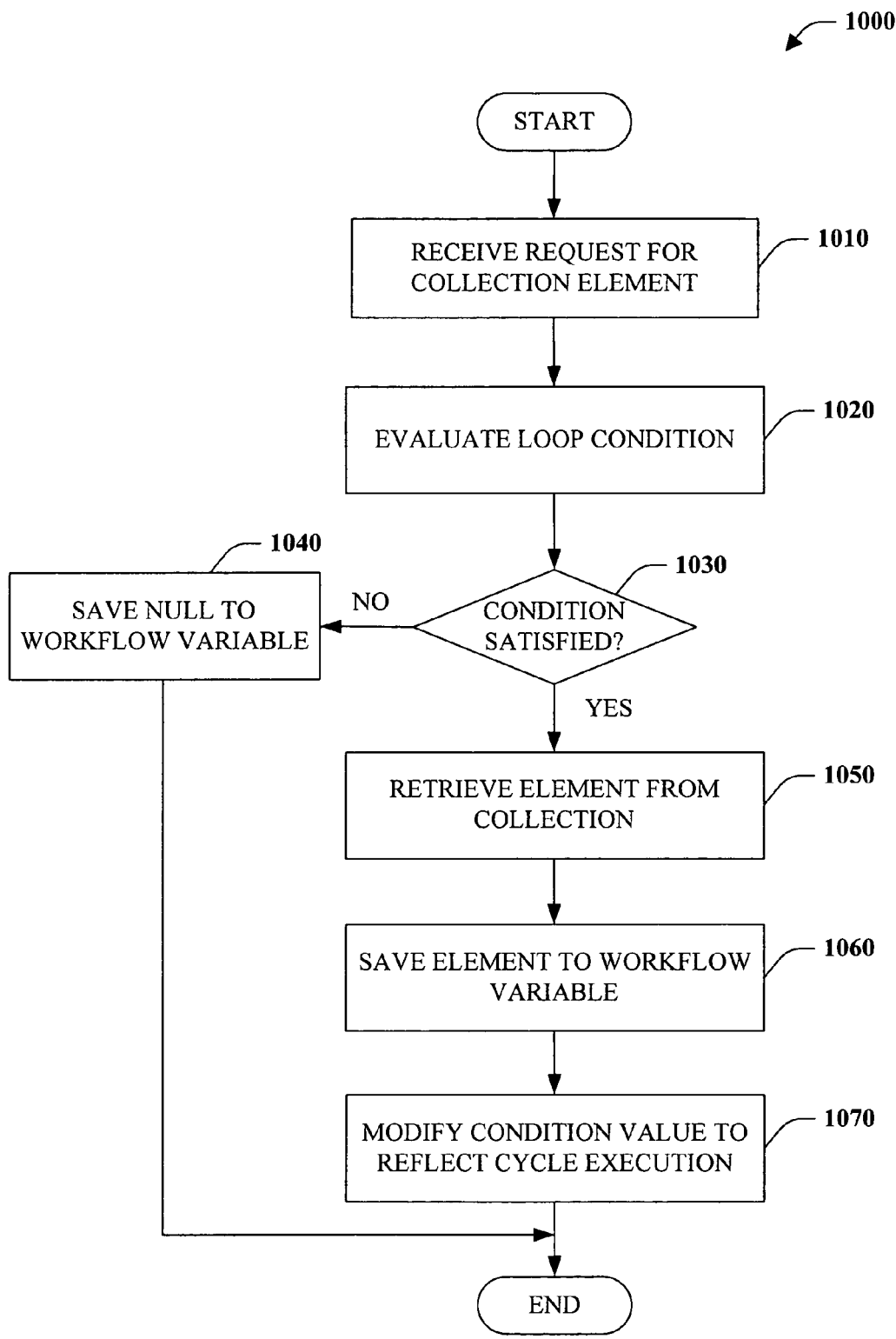
FIG. 10 is a flow chart diagram of an enumerator methodology.

FIG. 10 is a flow chart diagram of an enumerator methodology 1000 in accordance with an aspect of the subject innovation. A request for a collection element is received at 1010. At reference numeral 1020, a loop condition(s) is evaluated. For example, evaluation of the loop condition can correspond to determining whether all collection elements have been iterated through once. At numeral 1030, a determination is made as to whether the condition(s) are satisfied. If the condition is not satisfied, then the method continues at 1040. Alternatively, if the condition is successfully evaluated meaning the condition is satisfied, the method can proceed to reference numeral 1050. At numeral 1040, a null value is saved to the to a workflow variable associated with the requesting entity. The null value indicates that the iteration is complete and there are no more collection elements on which to operate. At reference numeral 1050, where the condition is satisfied, the next element in a collection is retrieved. At numeral 1060, the retrieve element is saved to the workflow variable associated with a requesting entity. At reference numeral 1070, the loop condition is modified to represent execution of a cycle or iteration. For example, a new value can be assigned to an expression variable. The method can thereafter terminate successfully.

Figure 11:
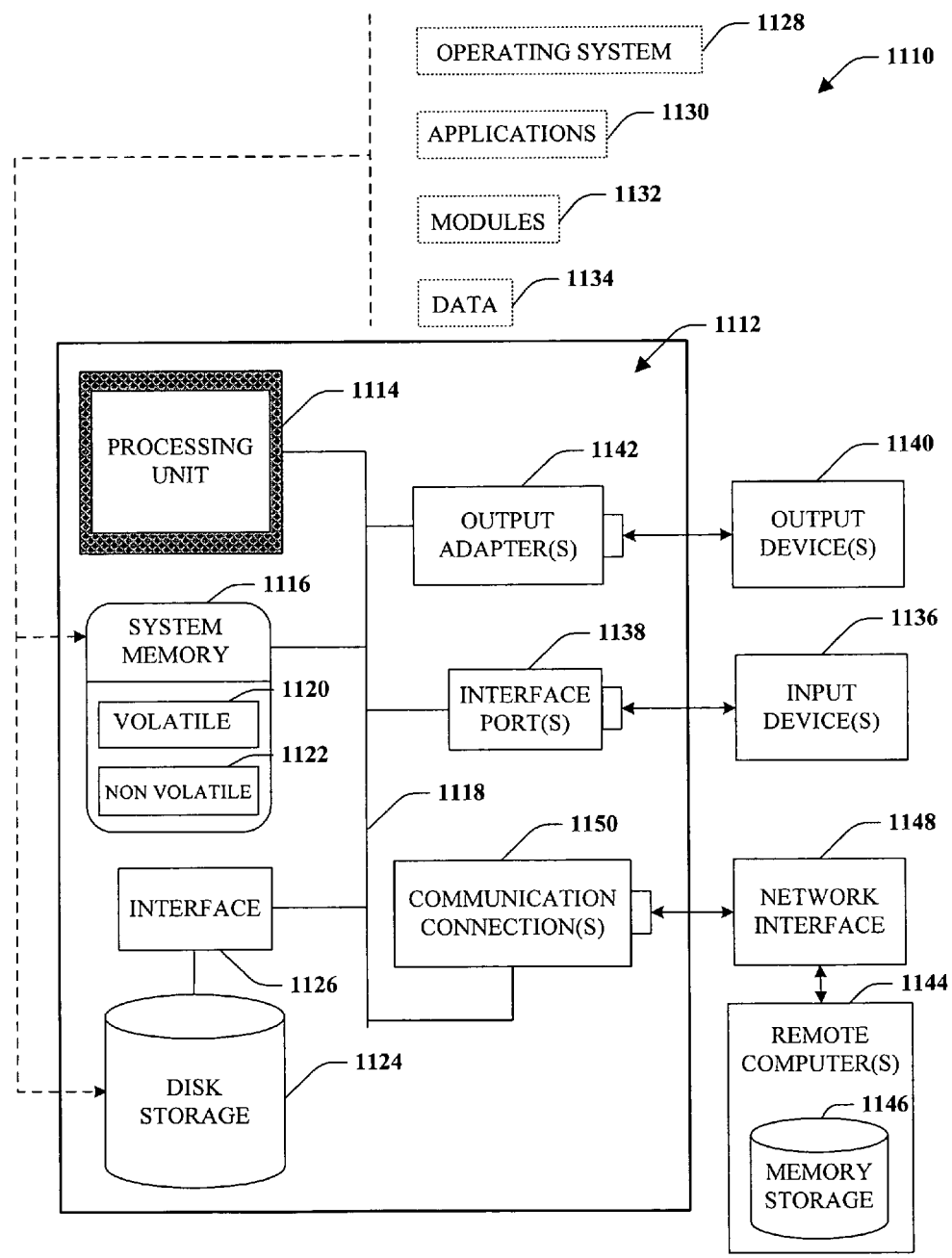
FIG. 11 is a schematic block diagram illustrating a suitable operating environment for aspects of the subject innovation.
Figure 12:
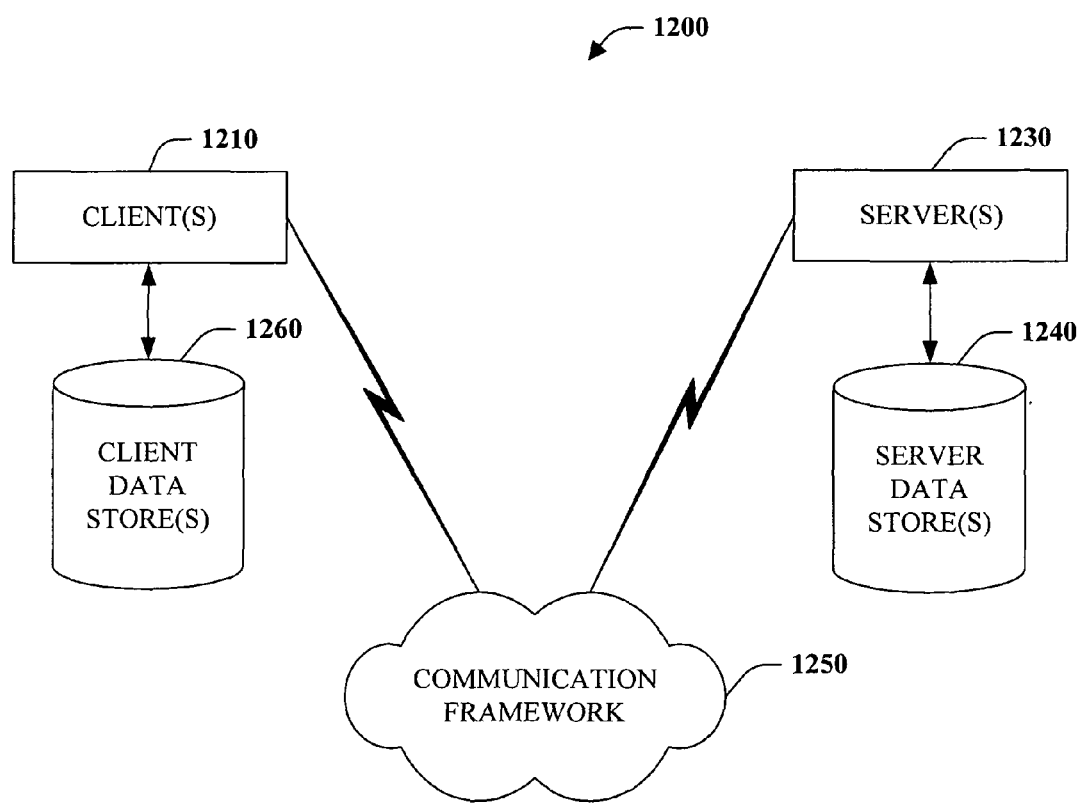
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116, and a system bus 1118. The system bus 1118 couples system components including, but not limited to, the system memory 1116 to the processing unit 1114. The processing unit 1114 can be any of various available microprocessors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in suitable operating environment 1110. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user enters commands or information into the computer 1112 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136. Thus, for example, a USB port may be used to provide input to computer 1112 and to output information from computer 1112 to an output device 1140. Output adapter 1142 is provided to illustrate that there are some output devices 1140 like displays (e.g., flat panel and CRT), speakers, and printers, among other output devices 1140 that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1116, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A workflow execution system comprising a processor that executes computer-implemented components, and a memory that stores the following computer-implemented components:
   an interface component that acquires a loop container of a workflow designated for parallel execution, wherein the workflow comprises an automation of business processes, wherein the loop container defines an execution sequence for the workflow, and wherein the execution sequence is associated with a plurality of elements;
   a clone component that generates a plurality of clones of the loop container; and
   a connector component that communicatively couples the plurality of clones to a single enumerator component, wherein the single enumerator component receives requests from each of the plurality of clones for an element of the plurality of elements, and in response to receiving the requests, provides a next element in the plurality of elements to the clone making the request such that the clone making the request executes the execution sequence on the next element provided by the single enumerator component.

2. The workflow execution system of claim 1, the loop container is a for-each loop container.

3. The workflow execution system of claim 1, the clone component includes a workflow component that replicates loop workflow.

4. The workflow execution system of claim 1, the clone component includes an environment component that replicates dependent objects of the workflow.

5. The workflow execution system of claim 4, the dependent objects include at least one of a variable and a connection manager.

6. The workflow execution system of claim 1, the plurality of clones are generated at runtime.

7. A method, performed by a processor of a computer, of workflow loop processing comprising the following computer-implemented acts:
   acquiring, by the processor, a loop container of a workflow designated for parallel execution, wherein the workflow comprises an automation of business processes, wherein the loop container defines an execution sequence for the workflow, and wherein the execution sequence is associated with a plurality of elements;
   generating, by the processor, a plurality of cloned instances of the loop container; and communicatively coupling, by the processor, the plurality of cloned instances to a single enumerator component, wherein the single enumerator component receives requests from each of the plurality of cloned instances for an element of the plurality of elements, and in response to receiving the requests, provides a next element in the plurality of elements to the cloned instance making the request such that the cloned instance making the request executes the execution sequence on the next element provided by the single enumerator component.

8. The method of claim 7, generating a plurality of cloned instances comprises persisting the loop container and un-persisting the plurality of cloned instances.

9. The method of claim 7, further comprising scheduling the plurality of cloned instances to execute concurrently.

10. The method of claim 7, further comprising checking an attribute associated with the loop container and generating the plurality of clone instances only upon an indication that the loop container is to be parallelized.

11. The method of claim 7, further comprising determining executing system capability and generating a particular quantity of cloned instances based thereon.

12. A method, performed by a processor of a computer, of parallelized workflow loop execution comprising the following computer-implemented acts:

receiving, by a single enumerator that is executed by the processor, requests for an element of a plurality of elements from each of a plurality of cloned loops of a workflow designated for parallel execution, wherein the workflow comprises an automation of business processes, wherein each of the plurality of cloned loops of the workflow defines an execution sequence for the workflow, wherein the execution sequence performs functions on the plurality of elements, and wherein the plurality of cloned loops of the workflow having been generated and communicatively coupled to the single enumerator; and providing, by the single enumerator, a unique element to each of the plurality of cloned loops of the workflow in response to receiving the requests such that the cloned loop making the request executes the execution sequence on the unique element provided by the single enumerator.

13. The method of claim 12, providing the unique element to each of the plurality of cloned loops of the workflow comprises saving the unique element to a variable accessible by and associated with a particular cloned loop.

14. The method of claim 13, further comprising evaluating a loop condition and providing a unique element only upon satisfaction of the loop condition.

15. The method of claim 13, further comprising updating an assignment condition associated with the workflow upon providing an element to the requesting cloned loop.

16. The method of claim 13, further comprising providing a predetermined value upon request for an element when a loop condition is unsatisfied.

* * * * *